United States Patent [19]
Matsui et al.

[11] Patent Number: 4,919,462
[45] Date of Patent: Apr. 24, 1990

[54] CONNECTION FITTING FOR A CORRUGATED TUBE

[75] Inventors: Kazuhiro Matsui, Toyoake; Hiroji Kitagawa, Nagoya, both of Japan

[73] Assignee: Kitagawa Industries Co., Ltd., Nagoya, Japan

[21] Appl. No.: 183,239

[22] Filed: Apr. 19, 1988

[30] Foreign Application Priority Data

Apr. 28, 1987 [JP] Japan .................................. 62-105847
Jul. 23, 1987 [JP] Japan .................................. 62-184367

[51] Int. Cl.$^5$ ............................................. F16L 47/00
[52] U.S. Cl. ...................................... 285/175; 285/305; 285/332.4; 285/903; 285/423; 285/155; 285/156
[58] Field of Search ................. 285/7, 283, 332.4, 121, 285/129, 903, 155, 175, 305, 423; 174/92

[56] References Cited

U.S. PATENT DOCUMENTS

| | | | |
|---|---|---|---|
| 221,153 | 11/1879 | Chapin | 285/332.4 |
| 425,773 | 4/1890 | Franken | 285/332.4 |
| 1,196,928 | 9/1916 | Bylund | 285/332.4 |
| 3,250,551 | 5/1966 | Draudt | 285/7 |
| 3,711,632 | 1/1973 | Ghirardi | 285/903 |
| 4,368,904 | 1/1983 | Lanz . | |
| 4,591,192 | 5/1986 | Van Exel et al. | 285/305 |
| 4,723,796 | 2/1988 | Nattel | 285/903 |

FOREIGN PATENT DOCUMENTS 3047867 7/1982 Fed. Rep. of Germany .
5812514 3/1981 Japan .

*Primary Examiner*—Randolph A. Reese
*Assistant Examiner*—Anthony Knight
*Attorney, Agent, or Firm*—Oliff & Berridge

[57] ABSTRACT

A connection fitting for a corrugated tube includes a cylindrical housing, a bow-shaped locking element attached to the housing by a hinge portion and a corrugated tube for insertion into the housing. The cylindrical housing has two openings and a wall element between them for receiving a bow-shaped locking element provided with two pairs of ribs on its inner surface corresponding to the openings. When inserting the corrugated tube into the cylindrical housing, the corrugated tube is fixed firmly to the cylindrical housing by the ribs on the locking element engaging with the groove portions of the corrugated tube through the openings.

19 Claims, 12 Drawing Sheets

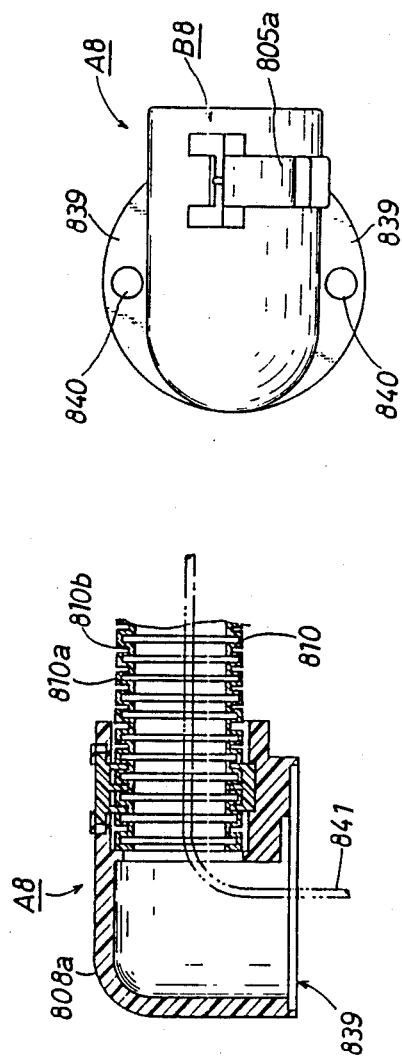

CONNECTION FITTING FOR A CORRUGATED TUBE

BACKGROUND OF THE INVENTION

This invention relates to a connection fitting for a corrugated tube.

A corrugated tube is used as a flexible wire-protecting tube for protecting wires such as wires in a building and wires in transportation machinery.

To join such corrugated tubes together and to connect a corrugated tube with another member, a connection fitting has been disclosed in U.S. Pat. No. 4,368,904 and Japanese published examined patent application Ser. No. 58-12514.

This type of connection fitting comprises a cylindrical housing for receiving an end of a corrugated tube and a C-shaped locking element. The cylindrical housing has an opening on the circumference wall. When inserting the locking element into the opening, both plural ribs projecting from the locking element and hook-like elements formed on the locking element engage respectively with grooves in the corrugated tube and with engaging members on the cylindrical housing. Thus the cylindrical housing is fixed to the end of the corrugated tube.

In the prior connection fitting, however, the C-shaped locking element is manufactured as one product separately from the cylindrical housing; a problem results that the small-size locking element is sometimes lost when connecting the connection fitting to the corrugated tube and when changing it to another one.

Another problem is the drastically reduced strength of the cylindrical housing since the opening on the cylindrical housing occupies a half round of the circumference wall.

SUMMARY OF THE INVENTION

Accordingly, the present invention is invented under an object to solve the above-mentioned problem.

It is an object of the present invention to provide a connection fitting for a corrugated tube in which the locking element is connected to the cylindrical housing by a hinge so as to prevent the locking element from being lost.

Another object of this invention is to provide a connection fitting for a corrugated tube which has a cylindrical housing having sufficient strength around its circumference.

A further object is to provide a connection fitting for a corrugated tube in which the locking element fits snugly enough into openings on the cylindrical housing for preventing an alien substance from entering.

To achieve these objects, the present invention relates to a connection fitting for a corrugated tube which comprises a cylindrical housing for receiving an end of the corrugated tube and a locking element connected to the cylindrical housing. The cylindrical housing has two open portions along a half round of the circumference wall with a wall element therebetween. The locking element has projecting ribs on its inner surface and is connected movably to the cylindrical housing by a hinge. When inserting the ribs into the openings, the tips of ribs engage with the grooves of the corrugated tube through the openings, thus fixing the cylindrical housing to the end of the corrugated tube.

BRIEF DESCRIPTION OF THE DRAWINGS

By way of example and to make the description more clear, reference is made to the accompanying drawings in which:

FIG. 1 is a perspective view of the connection fitting A1 for a corrugated tube and a corrugated tube 10;

FIG. 2 is a transverse sectional view of connection fitting A1 fixed to the corrugated tube 10;

FIG. 3 is a half sectional view of connection fitting A1 fixed to the corrugated tube 10;

FIG. 5 is an exploded perspective view of the connection fitting A3;

FIG. 6(A) is a transverse sectional view of connection fitting A3 fixed to a corrugated tube 310;

FIG. 6(B) is a sectional view of the pivot hinge element B3;

FIG. 7 is a partial exploded perspective view of the connection fitting A4;

FIG. 8 is a transverse sectional view when the connection fitting A4 is fixed to the corrugated tube 410;

FIG. 9 is a partial exploded perspective view of the connection fitting A5;

FIG. 10 is a transverse sectional view of connection fitting A5 fixed to the corrugated tube 510;

FIG. 11 is a front view of the connection fitting A6;

FIG. 12 is a sectional view of FIG. 11;

FIG. 13 is a side view of when the locking element 605a is released;

FIG. 14 is a transverse sectional view of connection fitting A6 fixed to the corrugated tube 610;

FIG. 15 is a sectional view of FIG. 14;

FIG. 16 is a front view of the connection fitting A7;

FIG. 17 is a sectional view of FIG. 16;

FIGS. 18 through 21 show a connection fitting A8 of an eighth embodiment;

FIG. 18 is a front view of the connection fitting A8;

FIG. 19 is a sectional view of FIG. 18;

FIG. 20 is a sectional view of the connection fitting A8 fixed to the corrugated tube 810;

FIG. 21 is a plan view of FIG. 20;

FIG. 22 is a plan view of the connection fitting A9;

FIG. 23 is a sectional view of FIG. 22;

FIG. 24 is a front view of the connection fitting A9;

FIG. 25 is a plan view of the connection fitting A10;

FIG. 26 is a sectional view of FIG. 25;

FIG. 27 is a front view of the connection fitting A10;

FIG. 28 is a plan view of the connection fitting A11;
FIG. 29 is a sectional view of FIG. 28; and
FIG. 30 is a front view of the connection fitting A11.

DETAILED DESCRIPTION OF A PREFERRED EMBODIMENT

A first embodiment of the present invention will be explained hereinafter referring to FIGS. 1 through 3.

Figure 1:
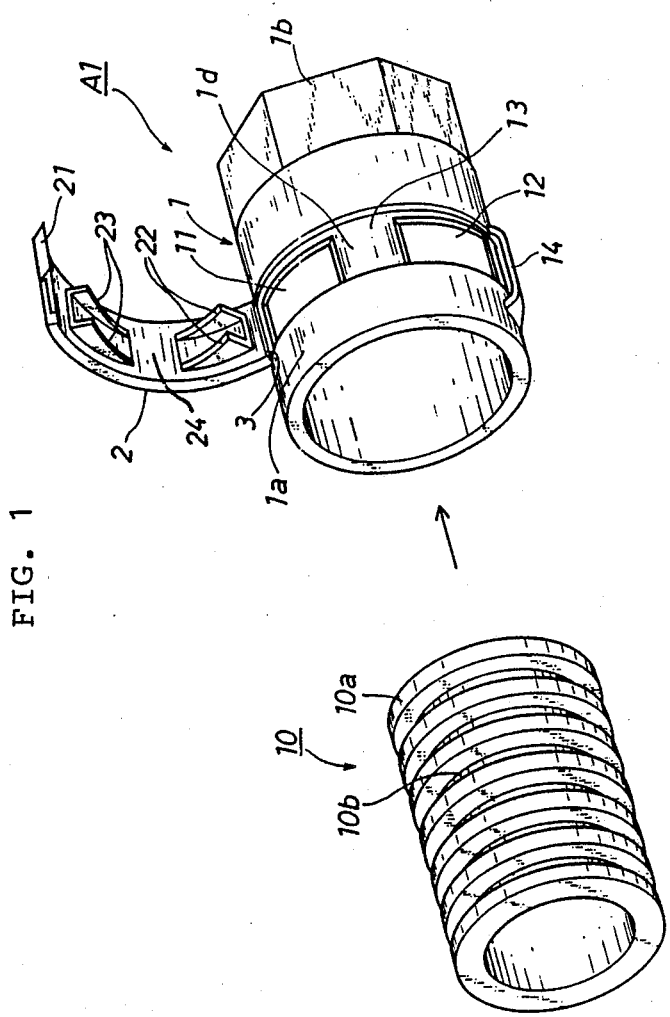
FIGS. 1 through 3 show a connection fitting A1 for a corrugated tube of a first embodiment.
Figure 2:
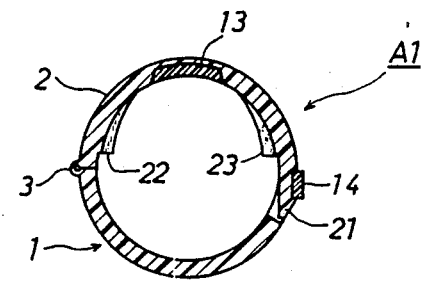

FIG. 1 is a perspective view of a connection fitting A1 and a corrugated tube 10. FIG. 2 is a transverse sectional view of a bow-shaped locking element 2 locked to the connection fitting A1.

The connection fitting A1 comprises a cylindrical housing 1 and a locking element 2 connected movably to the cylindrical housing by a thin walled hinge portion 3. The cylindrical housing 1 and the locking element 2 are made of synthetic resin as one body.

The cylindrical housing 1 consists of a main portion 1a and a threaded portion 1b having an internal thread. The main portion 1a has a bore slightly bigger than the outer diameter of the corrugated tube 10. The bore of the threaded portion 1b is smaller than the outer diameter of the corrugated tube 10. Accordingly, as shown in FIG. 3, an uneven portion 1c is formed on the border of the main portion 1a and the threaded portion 1b so that the end of the corrugated tube 10 may not go further than the uneven portion 1c when the tube 10 is inserted.

On the half round of the circumference wall of the main portion 1a, a sunken portion 1d is provided wherein two openings 11 and 12 and a wall element 13 having a wall element surface between the openings 11 and 12 are formed for receiving the locking element 2. The locking element 2 is connected near one end of the opening 11 by a thin walled hinge portion 3. On the extreme opposite portion of the connection of the locking element 2, that is, near one end of the opening 12, an engaging member 14 is provided so as to be engaged with a hook-like element 21 of the locking element 2.

The locking element 2 is bow-shaped in order to fit into the bow-shaped sunken portion 1d of the main portion 1a. From the inner surface of the locking element 2, two projecting pairs of ribs 22 and 23 can be moved to pass through openings 11 and 12 of the cylindrical housing 1. The locking element 2 includes a recess 24 having a recess surface located between the pairs of ribs 22 and 23. These two pairs of ribs 22 and 23 are formed in a determined place where the ribs 22 and 23 will engage properly with the grooves 10b of the corrugated tube 10 inserted into the cylindrical housing. For example, the distance between the ribs 22 and 23 is almost the same as the width of the corrugations 10a of the corrugated tube 10, and the highest point of the ribs 22 and 23 is almost equal to the depth of the grooves 10b of the corrugated tube 10.

Usage of the connection fitting A1 for a corrugated tube having the above-structure will be explained.

Figure 3:
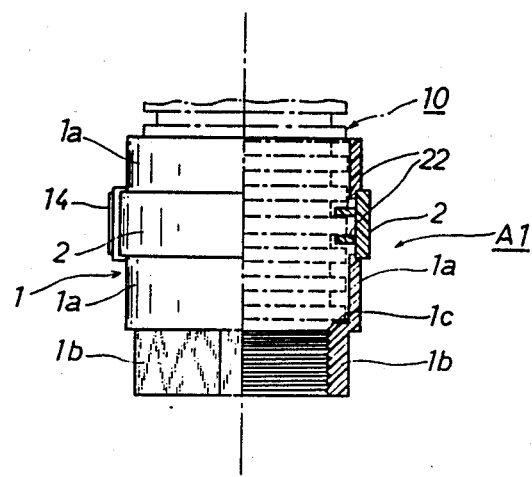

As shown in FIG. 3, the end of the corrugated tube 10 is inserted into the cylindrical housing 1 till it abuts against the uneven portion 1c of the main portion 1a. The locking element 2 is fitted into the sunken portion 1d of the circumference of the cylindrical housing 1 by closing two openings 11 and 12 with the ribs 22 and 23. Next, the hook-like element 21 on the tip of the locking element 2 is engaged with the engaging member 14 on one end of the opening 12. In this closed position, substantially the entire wall element surface of the wall element 13 is in contact with the recess surface of the recess 24.

Explanation will now made of how each member is engaged referring to FIG. 3.

Ribs 22 and 23 on the inner surface of locking element 2 are moved to project through openings 11 and 12 of the main portion 1a and engage with the grooves 10b of the corrugated tube 10. Such firm engagement ensures reliable fixture.

Other embodiments will be explained as follows. In the relating drawings, elements that are similar to those in the first embodiment are designated by numbers of the same last two digits.

Figure 4:
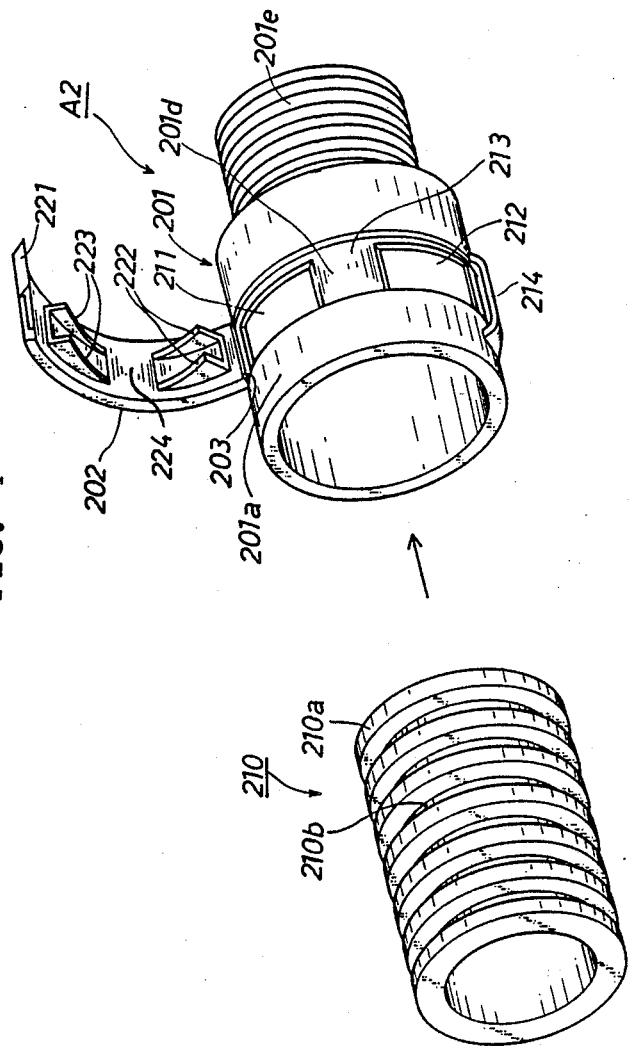
FIG. 4 is a perspective view of a connection fitting A2 for a corrugated tube and a corrugated tube 210 of a second embodiment.

A second embodiment of a connection fitting A2 will be explained hereinafter referring to FIG. 4.

Although the connection fitting A2 has a similar structure to the connection fitting A1, the threaded portion 201e of the connection fitting A2 has an external thread. By applying both connection fittings A1 and A2, it becomes possible to connect corrugated tube 10 with corrugated tube 210. In order to connect corrugated tube 10 with corrugated tube 210, the threaded portion 201e of the connection fitting A2 must be screwed into the threaded portion 1b of connection fitting A1 and the corrugated tube 210 is inserted into the cylindrical housing 201 of the connection fitting A2 in the same way as the first embodiment. After that, when the main portion 201a of the cylindrical housing 201 is closed with locking element 202, the corrugated tube 210 is fixed to the connection fitting A2, thus completing the connection of corrugated tube 10 with corrugated tube 210.

When connecting the corrugated tube 10 to any other element, the threaded portion 1b of the connection fitting A1 is screwed onto the external threaded portion of the element (which is not shown).

In this way, the connection fitting A1 or A2 is fixed to the corrugated tube 10 or 210 very easily only by closing the cylindrical housing 1 or 201 with the locking element 2 or 202. There is no fear of losing the locking element 2 or 202 because it is connected to the cylindrical housing 1 or 201 by a hinge portion 3 or 203. Furthermore, since the main portion 1a or 201a has the wall element 13 or 213 between the openings 11 and 12, or 211 and 212, the connection fitting is constructed strongly.

A third embodiment of a connection fitting A3 will be explained hereinafter referring to FIG. 5, FIGS. 6(A) and 6(B).

Figure 5:
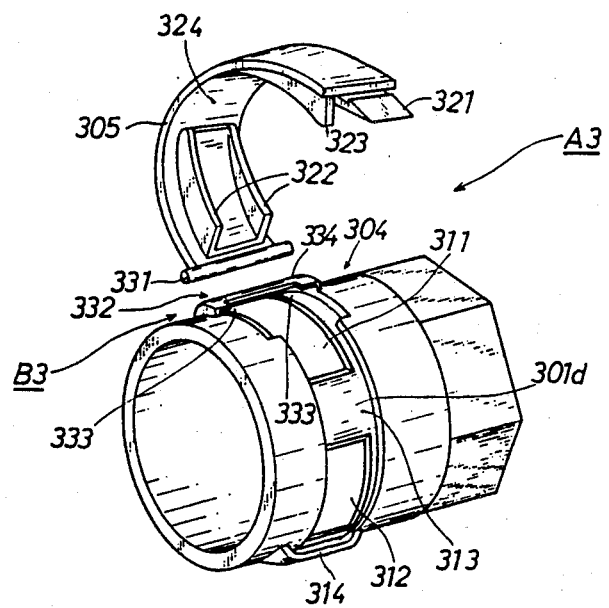
FIG. 5, FIGS. 6(A) and 6(B) show a connection fitting A3 of a third embodiment.

FIG. 5 shows a perspective view of the connection fitting A3. FIG. 6(A) shows a transverse sectional view of FIG. 5. In this embodiment, a locking element 305 is connected to a cylindrical housing 304 by a pivot hinge portion which is separable; locking element 305 is similar to connection fitting A1 except for the pivot hinge portion B3.

Figure 6:
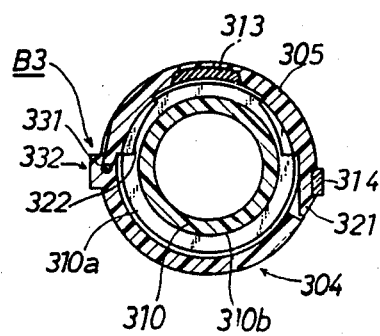
Figure 6:
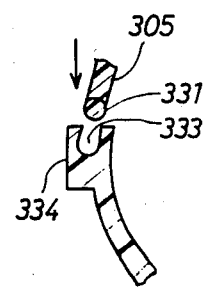

The pivot hinge portion B3 comprises a pivot 331 on the end of the locking element 305 and a pivot connector 332 near one end of the opening 311 on the cylindrical housing 301. The pivot connector 332 has a connecting groove portion 333, formed near one end of the opening 311, into which pivot 331 penetrates, and also has a covering element 334 which covers the connection groove portion 333. Namely, the connection groove portion 333 is formed in the pivot connector 332 and is covered by the covering element 334. The entrance portion of the connecting groove portion 333 is a little narrow as shown in FIG. 6 (B). The pivot 331 pushes through this narrow portion and enters the connecting groove 333, constituting a configuration that does not allow unintentional detachment from the pivot connector 332.

In the above-structured connection fitting A3, the locking element 305 is provided with a pivot hinge portion B3 which can be stronger when made of synthetic resin (including glass fiber or fireproofing compound additive), compared to the connection fitting A1 having a thin walled hinge portion. The fixation of the connection fitting A3 to the end of the corrugated tube 10 is done in the same manner as the connection fitting A1. That is, at first, the end of the corrugated tube 310 is inserted into the cylindrical housing 304, and the bow-shaped locking element 305 is fitted into the sunken portion 301d on the cylindrical housing 301. The ribs 322 and 323 projecting from the locking element 302 pass through the openings 311 and 312 and engage with the grooves 10b of the corrugated tube 10, thus firmly fixing the connection fitting to the end of the corrugated tube 10. The locking element 305 having a hook-like element 321 is connected to the cylindrical housing 304 by the pivot hinge portion B3, by which the detachment from the cylindrical housing 304 is prevented.

A fourth embodiment of a connection fitting A4 will be explained hereinafter referring to FIGS. 7 and 8.

Figure 7:
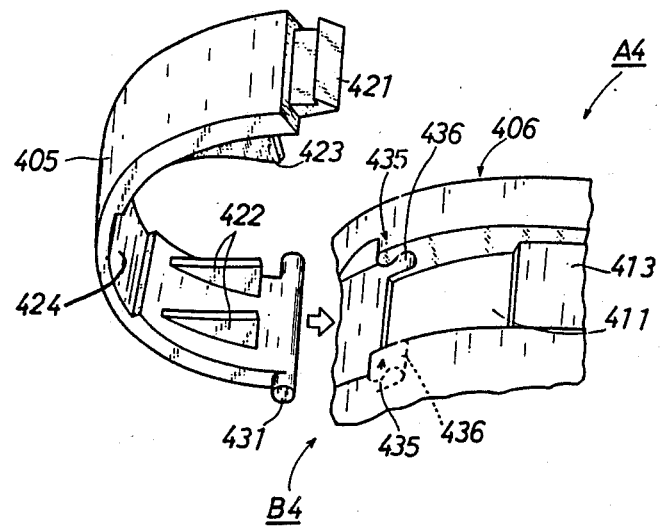
FIGS. 7 and 8 show a connection fitting A4 of a fourth embodiment.
Figure 8:
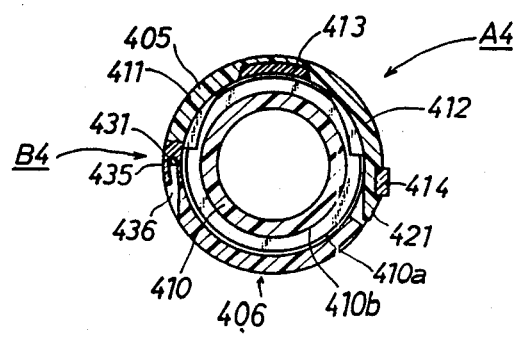

FIG. 7 shows a partial perspective view of the connection fitting A4. FIG. 8 shows a transverse sectional view of the fixation. In this embodiment, the locking element 405 is connected to the cylindrical housing 406 by a pivot hinge portion B4 which is separable like that of connection fitting A3. The pivot hinge portion B4 comprises a pivot formed on the end of the locking element 405 and a pivot connector 435 formed near one end of the opening 411 on the cylindrical housing 406. The pivot connector 435 has a connecting groove portion 436 formed under the surface near the opening 411. Because of this, the locking element 405 must be inserted from below the opening 411. When the hook-like element 421 on the tip of the locking element 405 is engaged with the engaging members 414 formed on the cylindrical housing 406, the locking element 405 is locked firmly to the cylindrical housing 406. Like in the third embodiment, the pivot 431 pushes into the connecting groove portion 436 which holds it movably. Accordingly, even if the locking element 405 does not close the cylindrical housing 406, the locking element 405 is not detached from the cylindrical housing 406. As a result, the connection fitting A3 has a merit similar to that of the connection fitting A4, A fifth embodiment of a connection fitting A5 will be explained hereinafter referring to FIGS. 9 and 10.

Figure 9:
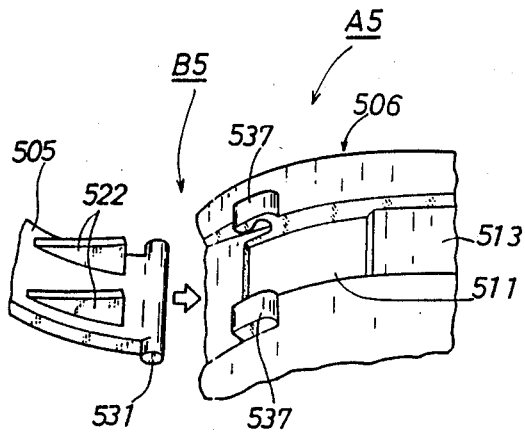
FIGS. 9 and 10 show a connection fitting A5 of a fifth embodiment.
Figure 10:
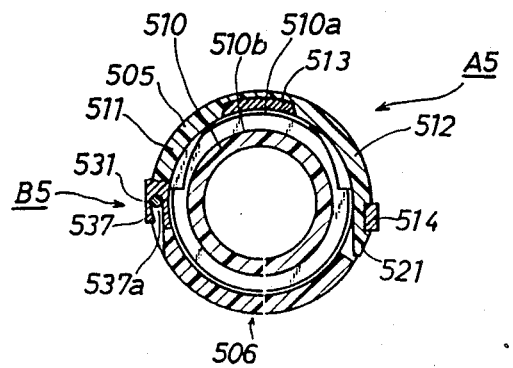

FIG. 9 shows a partial perspective view of the connection fitting A5. FIG. 10 shows a transverse sectional view when the cylindrical housing 506 is closed with the locking element 505. The connection fitting A5 has the same structure as the connection fitting A4 with the exception that the covering element of the pivot connector 537 protrudes from the cylindrical housing. Since the pivot 531 on the locking element 505 is inserted into the pivot connector 537 from below the opening of a connecting groove portion 537a, the locking element 505 is able to move, but does not easily detach from the cylindrical housing 506.

A sixth embodiment of a connection fitting A6 will be explained hereinafter referring to FIGS. 11 through 15.

Figure 11:
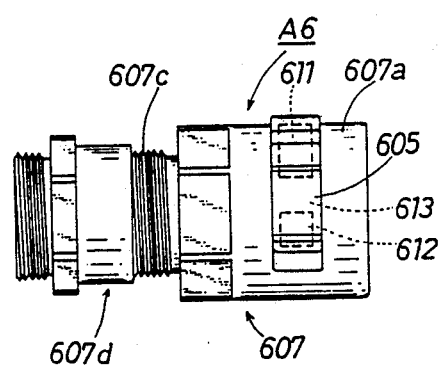
FIGS. 11 through 15 show a connection fitting A6 of a sixth embodiment.
Figure 12:
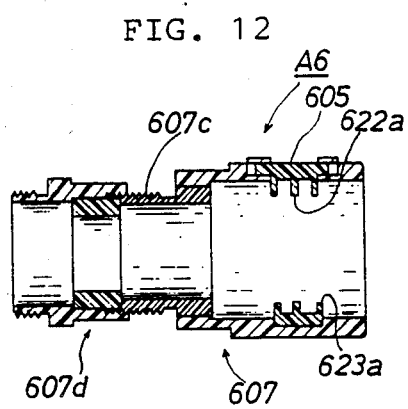
Figure 13:
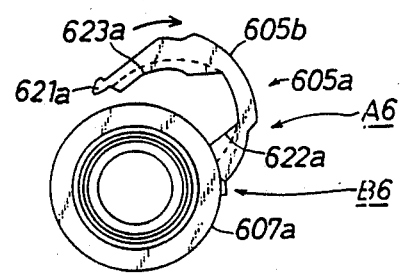
Figure 14:
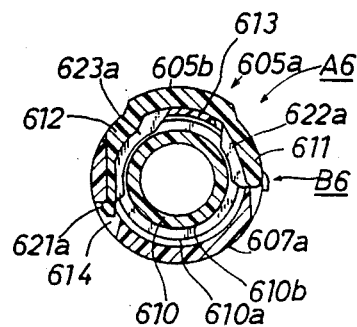
Figure 15:
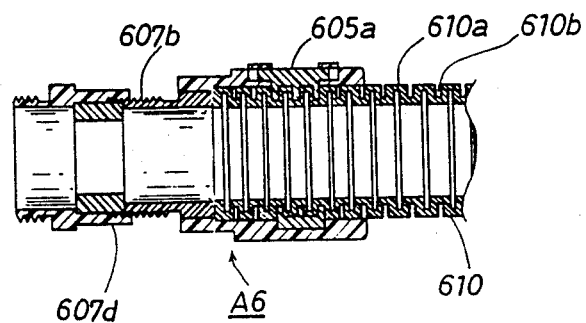

FIG. 11 is a front view of the connection fitting A6. FIG. 12 is a sectional view of FIG. 11. FIG. 13 is a side view of when the locking element 605a is released. FIG. 14 is a transverse sectional view of when the cylindrical housing 607 is closed with the locking element 605a. FIG. 15 is a sectional view of corrugated tube 610 fixed to cylindrical housing 607.

The pivot hinge portion B6 in the connection fitting A6 is constructed like the one B5 in the connection fitting A5. However, the locking element 605a has different features from that of the connection fitting A6.

The locking element 605a has three-streak ribs 622a and 623a and rib 623a extends from the middle part to the hook-like element 621. The head part 605b of the locking element 605a is constructed to project away from surface of the main portion 607a. The threaded portion 607c next to the main portion 607a is an external threaded portion which enables the connection to the other threaded element 607d.

In the above-structured connection fitting A6, the corrugated tube 610 is fixed very firmly because the ribs 622a and 623a are provided with three streaks and the rib 623a extends to the hook-like element 621. Besides, when removing corrugated tube 610 from cylindrical housing 607, if one pushes the head part 605b in the arrow direction of FIG. 13, the locking element 605a is easily released.

Figure 17:
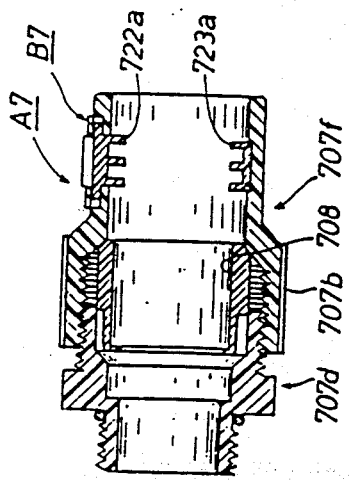
FIGS. 16 and 17 show a connection fitting A7 of a seventh embodiment.

A seventh embodiment of a connection fitting A7 will be explained hereinafter referring to FIG. 16 and FIG. 17.

Figure 16:
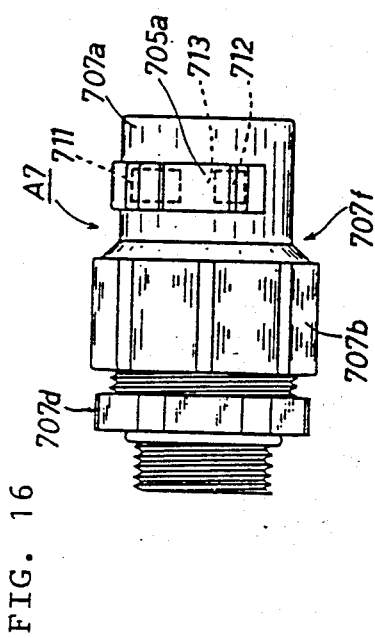

FIG. 16 is a front view of the connection fitting A7. FIG. 17 is a sectional view of FIG. 16. The connection fitting A7 has a similar construction to the connection fitting A6, but the following features are different. The cylindrical housing 707f has an internal threaded portion 707b into which an external thread element 707d is screwed. A bushing 708 made of rubber is mounted between the internal threaded portion 707b and the external thread element 707d and prevents them from moving.

The locking element 705a, the ribs 722a, 723a and the connection of the main portion 707a and the locking element 705a in the connection fitting A7 are the same as those in the connection fitting A6.

An eighth embodiment of a connection fitting A8 will be explained hereinafter referring to FIGS. 18 through 21.

Figure 19:
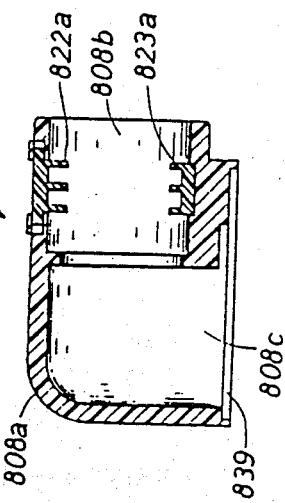
Figure 18:
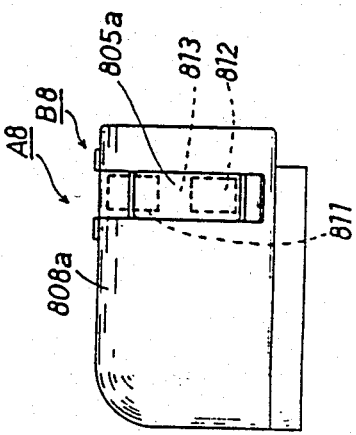

FIG. 18 shows a front view of the connection fitting A8. FIG. 19 is a sectional view of FIG. 18. FIG. 20 is a sectional view of when the corrugated tube 810 is fixed. FIG. 21 is a plan view of FIG. 20.

In the connection fitting A8, a cylindrical housing 808a does not have a threaded portion on its end, but is formed in L-shape for use as a corner. On the cylindrical housing 808a, one opening 808b is provided so as to receive the locking element 805a, and the other opening 808c is provided at an orientation 90 degrees from the opening 808b. By providing a flange 839 and an aperture 840 on the opening 808c, it is possible to connect to a plain plate or a wall element etc. by a screw or a bolt.

The locking element 805a, the ribs 822a, 823a, and the connection of the cylindrical housing 808a and the locking element 805a in the connection fitting A8 are the same as those in the connection fittings A6 and A7. As shown in FIG. 20, the above-structured connection fitting A8 is very useful when laying out a wiring 841 passing through the corrugated tube 810 around a 90 degrees corner.

Figure 23:
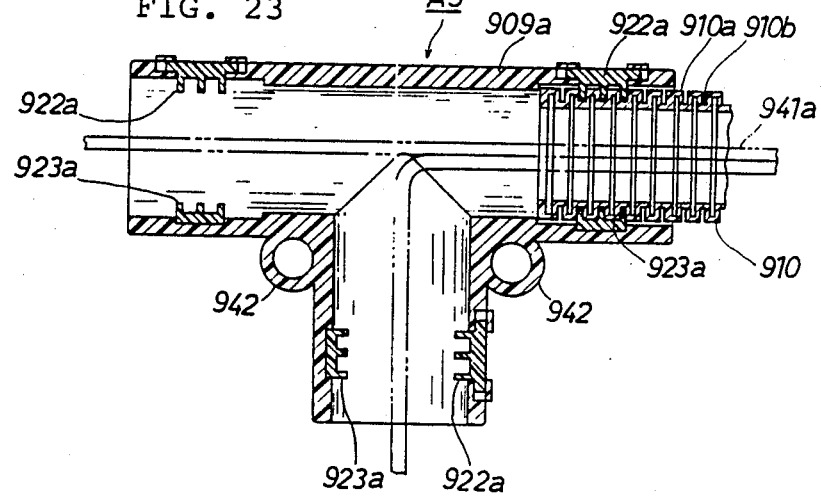
Figure 24:
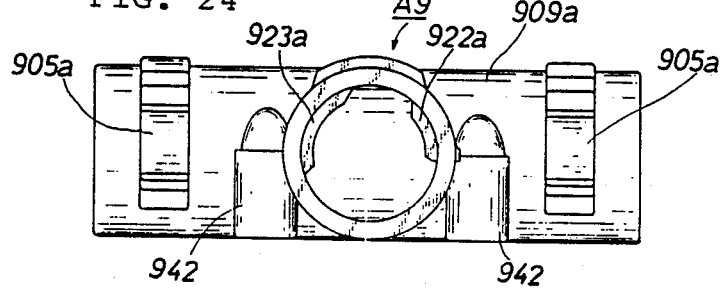

A ninth embodiment of a connection fitting A9 will be explained hereinafter referring to FIGS. 22 through 24.

Figure 22:
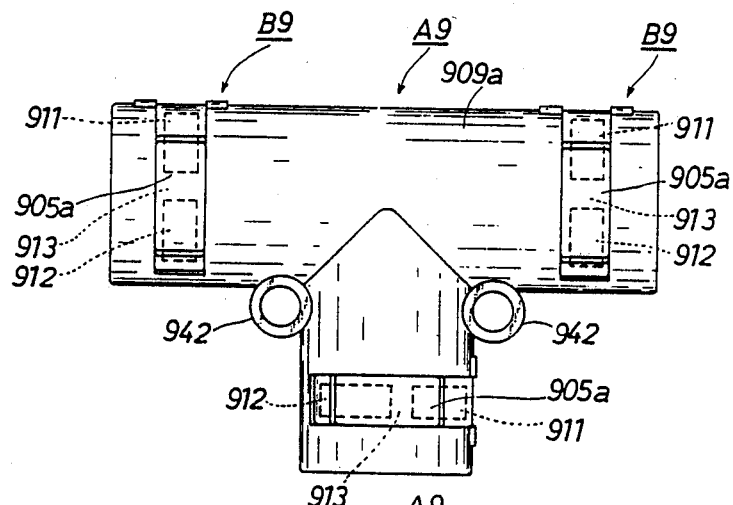
FIGS. 22 through 24 show a connection fitting A9 of a ninth embodiment.

FIG. 22 is a view of the connection fitting A9. FIG. 23 is a sectional view of FIG. 22. FIG. 24 is a front view of the connection fitting A9.

In the connection fitting A9, a cylindrical housing 909a does not have a threaded portion on the end, but is formed in a T-shape. The T-shaped cylindrical housing 909a has connecting means 942 in which a screw or a nail is inserted to allow connection with a plain plate or a wall element. Locking elements 905a are provided on every end of the cylindrical housing 909a.

The locking element 905a, the ribs 922a, 923a and the way of the fixation of the cylindrical housing 909a and the locking element 905a in the connection fitting A9 are the very same as those in the connection fittings A6 through A8.

The above-structured connection fitting A9 is very useful when laying out a wire having branches 941a which pass through the corrugated tube 910.

Figure 26:
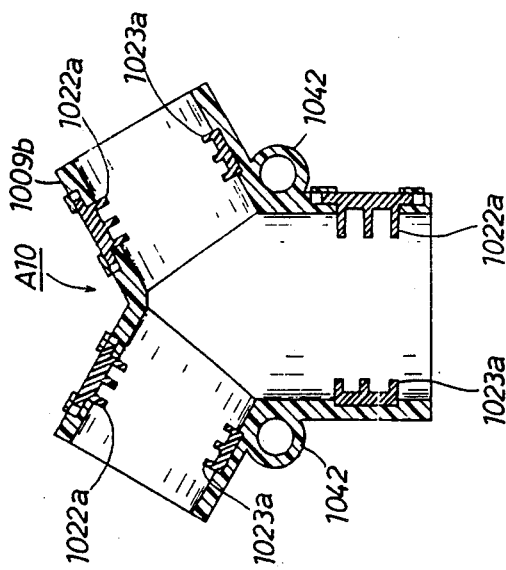
FIGS. 25 through 27 show a connection fitting A10 of a tenth embodiment.
Figure 27:
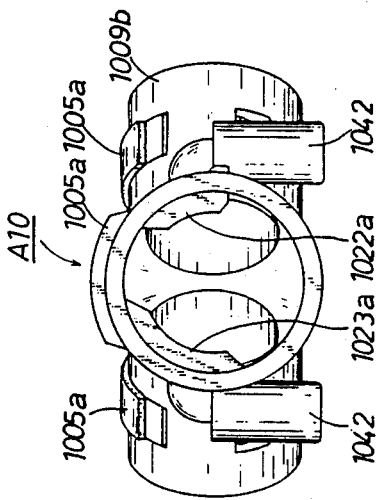

A tenth embodiment of a connection fitting A10 will be explained hereinafter referring to FIGS. 25 through 27.

Figure 25:
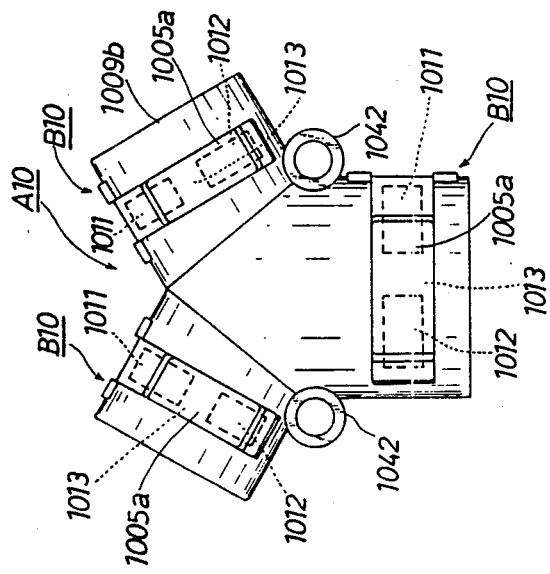

FIG. 25 is a plan view of the connection fitting A10. FIG. 26 is a sectional view of FIG. 25. FIG. 27 is a front view of the connection fitting A10.

In the connection fitting A9, a cylindrical housing 1009b which is Y-shaped is the only part different from those of the connection fitting A9.

Figure 29:
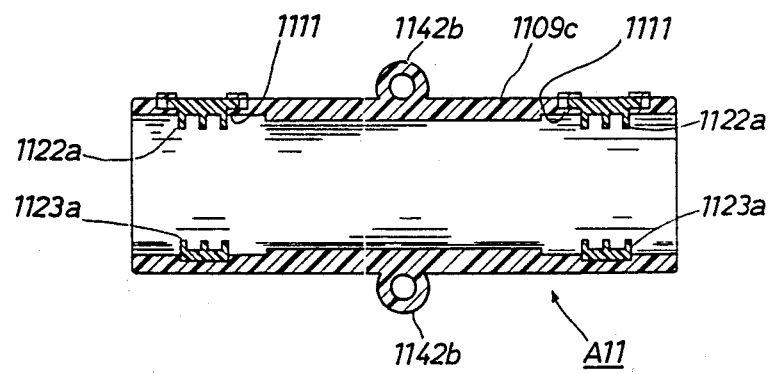
Figure 30:
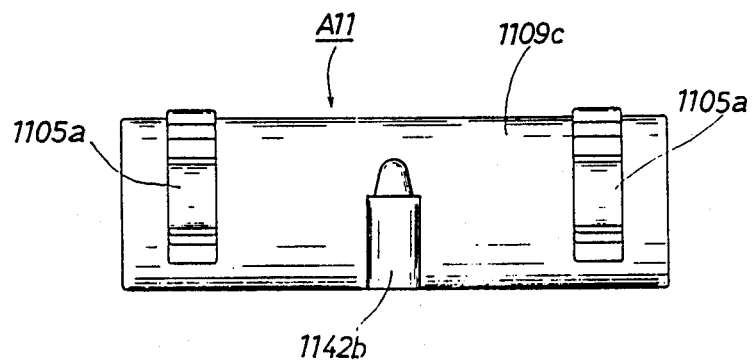

An eleventh embodiment of a connection fitting A11 will be explained hereinafter referring to FIGS. 28 through 30.

Figure 28:
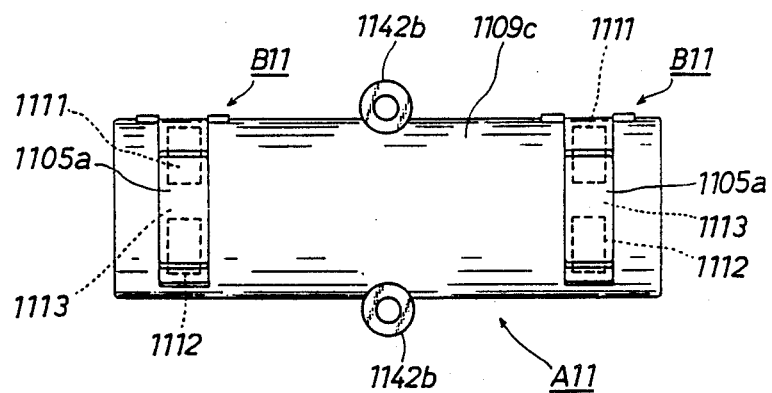
FIGS. 28 through 30 show a connection fitting A11 of an eleventh embodiment.

FIG. 28 is a plan view of the connection fitting A11. FIG. 29 is a sectional view of FIG. 28. FIG. 30 is a front view of the connection fitting A11.

The connection fitting A11 comprises one cylindrical housing 1109c, locking elements 1105a on both opposite ends, and connecting means 1142b on both a upper portion and a lower portion in the middle part of the cylindrical housing 1109c.

The locking element 1105a, the ribs 1122a, 1123a, and the way of the fixation of the cylindrical housing 1109c and the locking element 1105a in the connection fitting A11 are the very same as those in the connection fittings A6 through A10.

Obviously, many modifications and variations of the present invention are possible in light of the above teachings. It is therefore to be understood that within the scope of the appended claims, the invention may be practiced otherwise than as specifically described.

What is claimed is:

1. A connection fitting for a corrugated tube having grooves, comprising:
    a cylindrical housing for receiving a corrugated tube, the housing having a pair of openings separated by a wall element;
    a bow-shaped locking element for selectively closing the openings and locking in the corrugated tube inserted into the cylindrical housing;
    said locking element having an inner peripheral surface with first and second sets of ribs which fit through the openings in the housing into grooves of the corrugated tube when the locking element is closed and locked, said locking element further including a recess between the sets of ribs, said recess corresponding in size to and receiving the wall element such that substantially the entire wall element surface is in contact with the recess;
    a hinge portion for connecting movably the locking element with the cylindrical housing;
    a hook-like element attached to an end of said locking element opposite said hinge portion; and
    an engaging member attached to an end of said opening portion and positioned to receive said hook-like element.

2. A connection fitting for a corrugated tube according to claim 1, wherein said hinge portion comprises a thin walled portion.

3. A connection fitting for a corrugated tube according to claim 1, wherein said hinge portion comprises a pivot and a pivot connector.

4. A connection fitting for a corrugated tube according to claim 3, wherein said pivot connector protrudes from the cylindrical housing.

5. A connection fitting for a corrugated tube according to claim 3, wherein said pivot connector is flush with a surface of the cylindrical housing.

6. A connection fitting for a corrugated tube according to claim 5, wherein said pivot connector is open with the opening portion.

7. A connection fitting for a corrugated tube according to claim 3, wherein the pivot connector is open against the opening portion.

8. A connection fitting for a corrugated tube according to claim 1, wherein each rib comprises two streaks of projections.

9. A connection fitting for a corrugated tube according to claim 1, wherein each rib comprises three or more streaks of projections.

10. A connection fitting for a corrugated tube according to claim 1, wherein the rib projects continuously from the center portion to the end portion on the locking element.

11. A connection fitting for a corrugated tube according to claim 1, wherein said cylindrical housing is bent.

12. A connection fitting for a corrugated tube according to claim 1, wherein a connection means is provided with the cylindrical portion for connection with any other elements.

13. A connection fitting for a corrugated tube according to claim 1, wherein an internal thread is provided with the cylindrical housing for connection to any other elements.

14. A connection fitting for a corrugated tube according to claim 1, wherein an external thread is provided with the cylindrical housing for connection with any other elements.

15. A connection fitting for a corrugated tube according to claim 1, wherein a flange is provided with the cylindrical housing for connection to any other elements.

16. A connection fitting for a corrugated tube according to claim 1, wherein said cylindrical housing is provided for receiving two corrugated tubes and each end of said cylindrical housing has the open portion, the wall element, the locking element (1105a), the rib and the hinge portion (B11).

17. A connection fitting for corrugated tubes according to claim 1, wherein said cylindrical housing is T-shaped for receiving three corrugated tubes and each of three ends of the T-shaped cylindrical housing has the open portion, the wall element, the locking element, the rib and the hinge portion (B9).

18. A connection fitting for corrugated tubes according to claim 1, wherein said cylindrical housing is Y-shaped for receiving three corrugated tubes and each of three ends of the Y-shaped cylindrical housing has the open portion the wall element, the locking element, the rib and the hinge portion.

19. A connection fitting for a corrugated tube according to claim 16, wherein a connecting means is provided with the cylindrical housing for connection to any other elements.

* * * * *